UNITED STATES PATENT OFFICE.

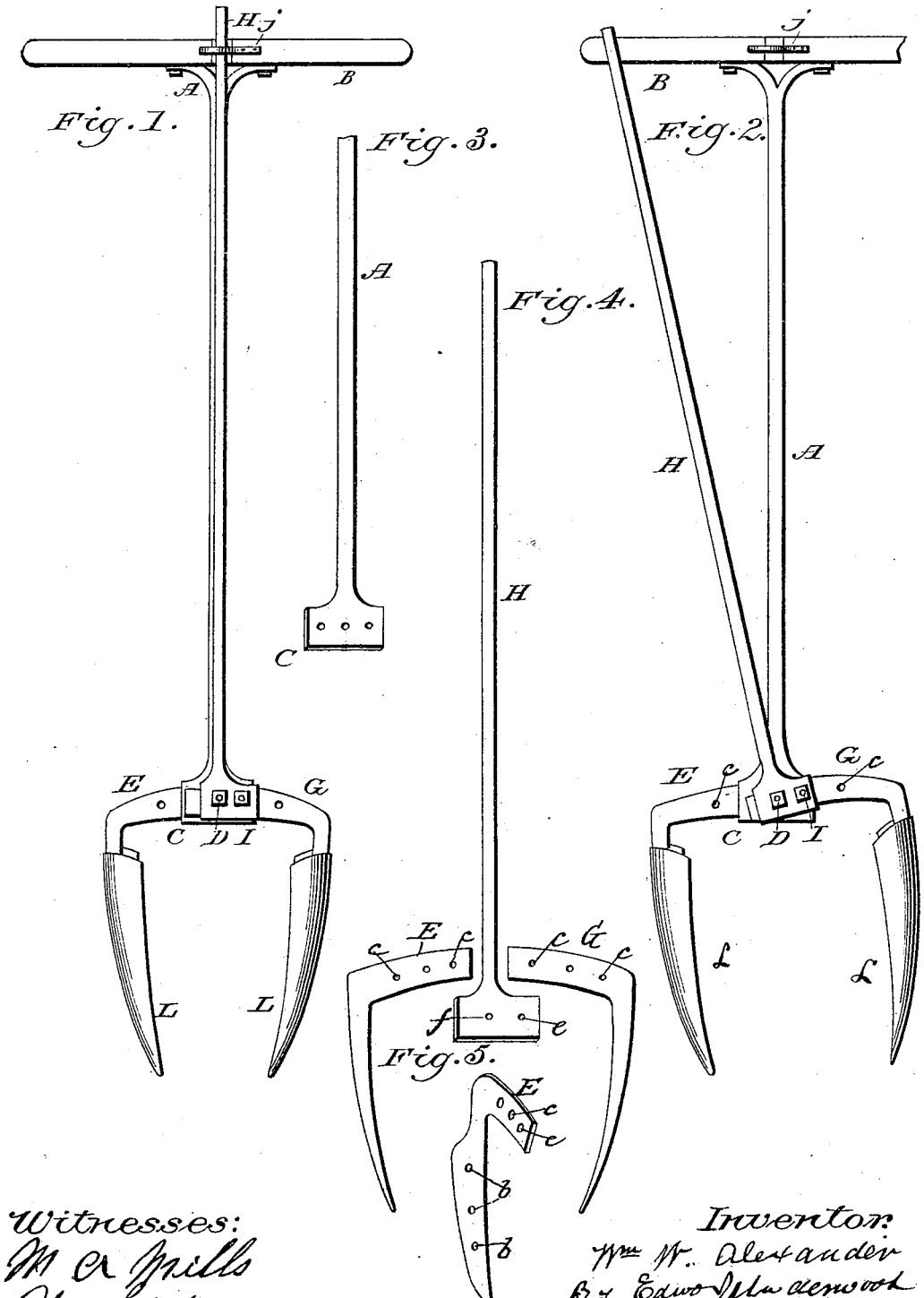

WILLIAM W. ALEXANDER, OF WINCHESTER, INDIANA.

POST-HOLE AUGER.

SPECIFICATION forming part of Letters Patent No. 269,773, dated December 26, 1882.

Application filed July 11, 1882. (No model.)

*To all whom it may concern:*

Be it known that I, WM. W. ALEXANDER, a citizen of the United States, residing at Winchester, in the county of Randolph and State of Indiana, have invented a new and useful Improvement in Post-Hole Augers, of which the following is a specification.

My invention relates to improvements in post-hole augers; and the objects of my improvements are, first, to provide a plan by which the auger can easily be cleaned by widening the points of the shovels; and, second, to afford facilities for the proper adjustment of the shovels for boring any sized holes. I attain these objects by the mechanism illustrated in the accompanying drawings, in which—

Figure 1 is an auger closed and ready for use. Fig. 2 is a view of the auger as it appears after the removal of the self-cleaning bar from under the spring on handle, and represents the shovels spread apart by the rod H, for the purpose of unloading or cleaning them. Fig. 3 is a view of the main shaft, to which the shovels are connected by the adjustable shanks represented in Fig. 5. Fig. 4 is a cut of the thin flat bar connected to one shank for cleaning. Fig. 5 shows detached views of the shoulders to which the shovels are attached.

Similar letters refer to similar parts throughout the several views.

A is a round wrought-iron shank, to the upper end of which is attached the handle B, which has a slot in one side covered by a spring, $j$, to receive and hold the rod or bar H.

At the lower end of the shank A are removably attached the shoulders G and E by means of a bolt, D, passing through one of the holes $c$ in the shoulders, and one of several holes, $d$, in the lower end of shank A, which has a flat elongated head, C, perforated in several places to receive the bolt D, and a countersunk screw which rigidly connects the shank A and the shoulder E.

Attached to the shoulder G by the same bolt, D, is the lower end of the rod or bar H, elongated and flattened for this purpose, which is also attached to the shoulder G by a pin, I, so that when rod H is loosened from the spring $j$ in the handle the shoulder G will turn on the pivot-bolt D, and spread the shovels apart for unloading and cleaning.

The shoulder E is rigidly connected with the head C at the lower end of the shank A by the bolt D, and a screw countersunk and passing through one opening $d$ in the head C. The connection of the bar H by the bolt D and the pin I to the shoulder G and by the bolt D to the head C gives the shoulder G and bar H, while rigidly connected together, a pivotal movement on said head C, while such pivotal movement is prevented at will by securing bar H through the spring $j$ to the handle B. The rods and shoulders are made of wrought or malleable iron. The shoulders E and G have a number of holes, $b$, in their lower ends, (shown in Fig. 5,) by which the shovels L are attached to them by bolts or screws, so that they can be readily removed for sharpening or in case of breakage. $c\ c\ c$ represent a series of three or more holes in the shoulders E and G, to permit widening or narrowing the bore of the auger, according as the bolt D is placed nearer to or farther from the ends of the shoulders.

The shovels L are made of steel, and are attached to the lower ends of shoulders E and G by screws or bolts, so that they can be removed at will.

$e$ and $f$ are the openings in the lower end of rod H, through which bolt D and pin I respectively pass.

Having thus fully described my invention, what I claim therein as new, and desire to secure by Letters Patent, is—

1. The arms or shoulders E and G, provided with a series of openings, $c$, for changing the bore of the auger, and another series of openings, $b$, for removably attaching the shovels L, in combination with said shovels L, shank A, and rod H, all as described and shown.

2. The combination of the rod H, locking into the handle B through the spring $j$, with the plate C at the bottom of the shank A, and the shoulder G, pivoted to the plate C by the bolt D, all substantially as described, and for the purposes specified.

WILLIAM W. ALEXANDER.

Witnesses:
WILLIAM R. CARSON,
JOHN T. CHENOWETH.